United States Patent Office 3,428,158
Patented Feb. 18, 1969

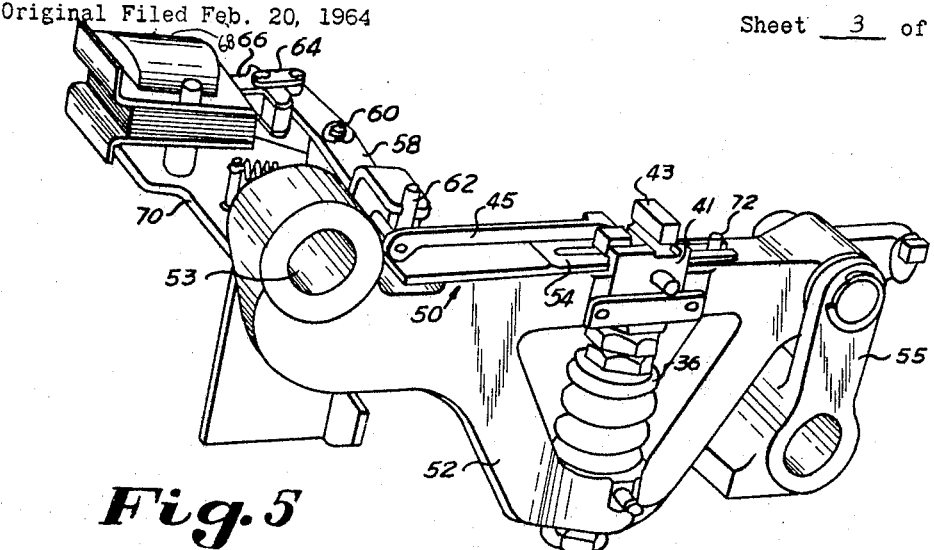
Fig. 5
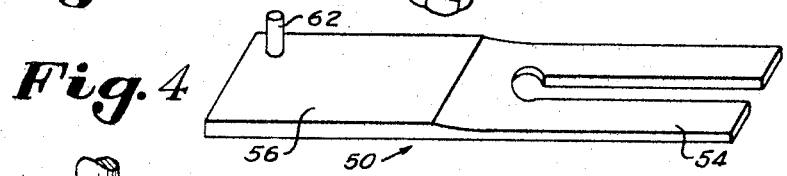
Fig. 4
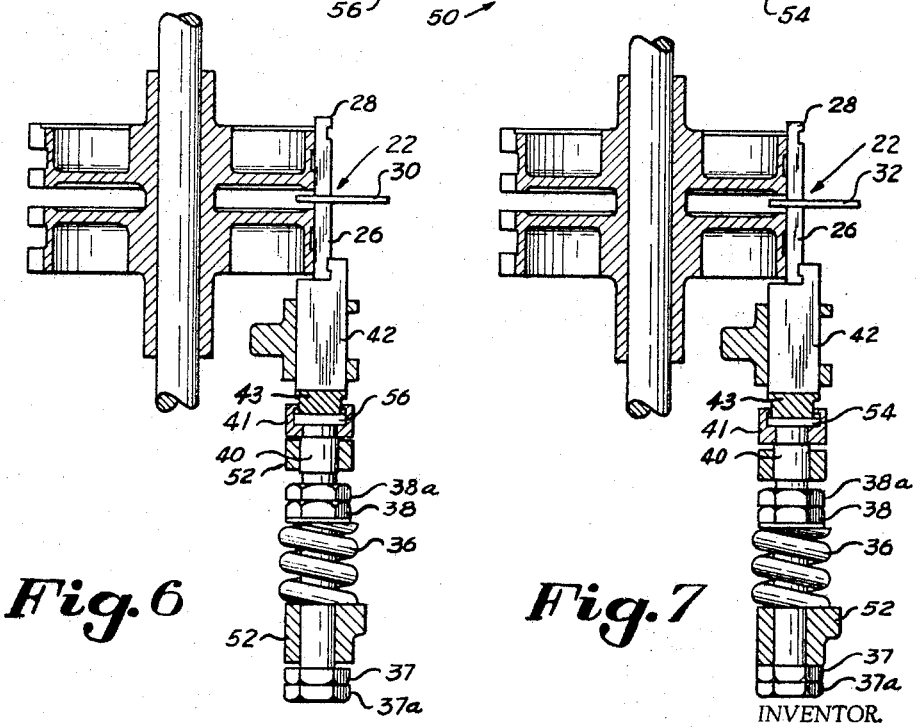
Fig. 6
Fig. 7
INVENTOR.
GEORGE W. BROWN
BY
Russell L. Root
ATTORNEY.

3,428,158
PRINT PRESSURE CONTROL MEANS IN CHARACTER EMBOSSING MACHINES
George W. Brown, Willoughby, Ohio, assignor to Addressograph-Multigraph Corporation, Cleveland, Ohio, a corporation of Delaware
Continuation of application Ser. No. 346,234, Feb. 20, 1964. This application Sept. 22, 1966, Ser. No. 581,301
U.S. Cl. 197—6.6        5 Claims
Int. Cl. B41j *11/20;* B41c *1/08*

This application is a continuation of my co-pending application Ser. No. 346,234, filed Feb. 20, 1964, now abandoned.

This invention relates to embossing machines and is concerned more particularly with apparatus and techniques effective to control the amount of pressure required in embossing operations.

Embossing machines employed in the preparation of printing devices, such as the printing plates utilized in mailing and other applications, and the embossed printing devices frequently employed in connection with credit transactions and the like, may be required to emboss a variety of printing devices with any one of a number of different kinds and sizes of type characters.

Previously known embossing machines have, in general, been sufficiently capable of adjustment so as to meet the requirements in this regard. However, with the advent of embossed credit plates, and particularly plastic credit plates, the requirements for versatility in embossing machines of this kind have increased substantially. This is particularly true where a single machine is utilized to emboss both metal and plastic printing and/or identification devices. By way of example, department stores maintain files on metal embossed printing plates for monthly billing purposes, promotion mailing, etc., and also issue embossed plastic credit cards to customers for presentation at time of purchase. A similar practice is followed by oil companies.

An important object of the invention is to adapt an embossing machine so that different types and thicknesses of materials may be embossed without the necessity for adjusting the amount of embossing pressure required for each of the materials by the laborious and time-consuming procedure heretofore required.

Another object of the invention is to provide an embossing machine wherein the embossing pressure may be quickly and conveniently changed for different materials and different thicknesses of materials.

The foregoing and other objects, features and advantages of the invention will be apparent from the following more particular description of a preferred embodiment of this invention as illustrated in the accompanying drawings, in which:

FIG. 4 is a perspective of an interposer illustrated in FIGS. 2 and 3;

FIG. 5 is a perspective of one assembly portion of the embossing machine;

FIG. 6 is a detail section substantially on line 6—6 of FIG. 1 illustrating the embossing of one type, or one thickness, of material;

FIG. 7 is a detail section similar to FIG. 6, but showing the embossing of another type, or thickness, of material;

Figure 1:
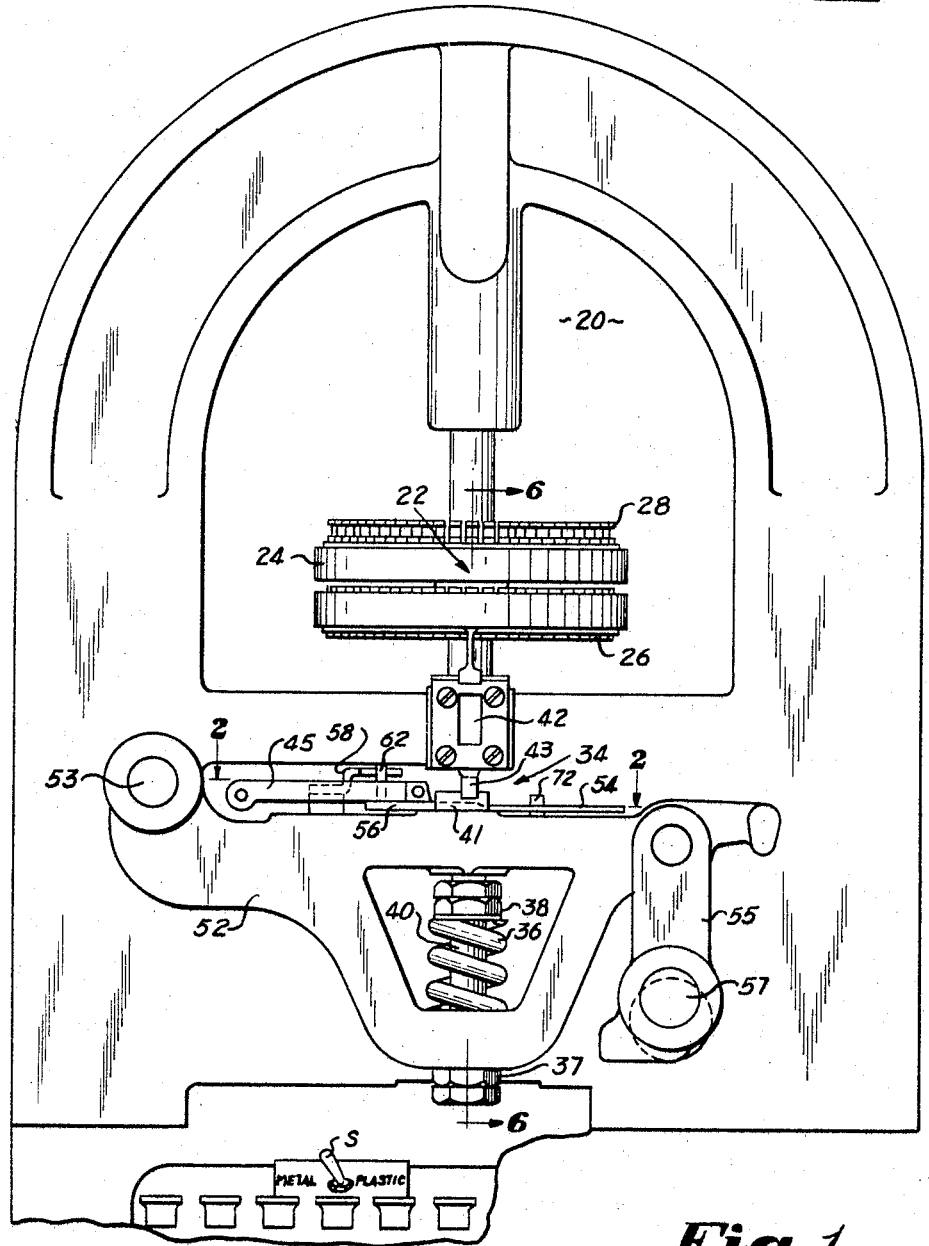
FIG. 1 is a front elevation of the embossing machine of the invention, with certain parts broken away.

The embossing machine 20 illustrated in FIG. 1, which constitutes a preferred embodiment of the invention, includes an embossing station 22 at which a rotary die head 24 is located. In many respects, the embossing machine is conventional in form and is substantially similar in construction and operation to the embossing machine described in Patent No. 2,115,456 to Chisholm, dated Apr. 26, 1938. The die head 24 includes a plurality of individual character dies 26 and 28 and a suitable actuating mechanism for driving the dies toward each other in an embossing operation to emboss printing or identification plates or like devices 30 and 32, FIGS. 6 and 7, when the latter are properly positioned at the embossing station 22 of the machine.

The embossing machine further includes a movable ram means, indicated generally at 34, FIG. 8 which is effective to drive the die 26 toward the die 28 as referred to hereinabove. Only the lower ram means is shown for the purpose of this invention. Complete details of the general structure of the embossing machine and the means for driving both the upper and lower ram means can be had by reference to the Chisholm patent referred to above.

It is sufficient to note that embossing is effected by the action of a rocker arm 52 pivoted at 53 and oscillated by a link 55 which operates from a power driven crank 57. Slidably associated with the rocker arm is a pin 40 which has on its upper end a slotted head 41 receiving a shiftable interposer 43 which is shifted and controlled in a known way by an actuating ink 45. When the interposer 43 is in one of its shifted positions, it acts upon a die plunger 42 which is designed to operate whichever die 26 is located above it. The pin 40 is upwardly urged by a powerful compression spring 36 which reacts at its lower end against the rocker arm 52 and at its upper end against an adjusting nut 38 on the pin 40. This spring 36 normally urges the pin to an upward rest position which can be accurately set by an adjusting stop nut 37 threaded on the lower end of the pin 40. During an embossing operation the spring 36 may yield slightly as the rocker arm 52 reaches its upper limit of motion, and the degree of deflection of the spring then determines the amount of pressure used in effecting the embossment. Of course, if the spring is not deflected at all, then lower embossing pressure will be obtained as determined by the dimensions of the parts, especially the length of die 26.

Embossing machines of this sort are capable of embossing a wide variety of printing and identification plates as, for example, zinc, steel, aluminum, plastic, etc., provided the dimensions of the parts and/or the pressure of spring 36 is adjusted to a proper value for each material. In addition, different thicknesses of these materials can also be accommodated by proper adjustment. The present invention represents an important advance in the embossing machine art, however, since heretofore it was necessary to remove the embossing machine housing, manually adjust the embossing pressure as required, which in each instance was different for each of the metal materials and for plastic materials, and then replace the embossing machine housing. According to the present invention this may now be done easily and quickly for two different materials, each requiring its own predetermined level of embossing pressure, by operating a control located at the keyboard or some other convenient place. For the sake of brevity, the invention will be described in connection with the embossing of metal and plastic plates in a single embossing machine, it being understood that the same principle may be utilized when other of the combinations referred to hereinabove are required.

Initial setting of the embossing pressure is accomplished in a manner now to be described with particular reference to FIG. 6.

Within rocker arm 52, the die driving pin 40 is vertically positioned to proper height by turning adjusting nut 37 to the left or right as the case may be. When proper height has been determined, nut 37 is locked in place by a lock nut 37a. Then a predetermined amount of tension is placed on spring 36 by the turning in one direction or the other of the nut 38. When the proper amount of tension is obtained the nut 38 is locked in place by a lock nut 38a. This adjustment then permits the pin 40 to strike die plunger 42 and raise die 26 with substantially the amount of pressure required to emboss a printing character on plate 30 or 32. It should be understood that an upper ram mechanism, not shown, simultaneously moves the corresponding die 28 to a lowered position, so that the dies squeeze a plate such as 30 between them thus completing the embossing operation.

It will be understood that the properties of the material to be embossed may control somewhat the nature of the pressure adjustment. For example, if the material is strongly resistant to deformation the adjustment may include setting the height adjustment within an appropriate limited range with the nut 37, and then obtaining precise pressure control by adjusting the spring length via nut 38. On the other hand, if the material is such that its deformation requires light pressures generally below the range of the spring 36, or if increased pressures are needed beyond the effective range of spring 36, then the system acts like a solid non-resilient system, and the nut 37 is used to give a very precise determination of the die length which in itself constitutes the ultimate pressure which will be generated in the material being embossed.

Heretofore, the time-consuming embossing pressure adjustment just described was fixed for the particular type of plate being embossed and necessarily required a complete re-working each time a plate of different material or of different thickness had to be embossed. In the case of certain prior machines an eccentric connection at the pivot point connecting rocker arm 52 and link 55 was provided so that a somewhat quicker adjustment could be made without disturbing the pin height or spring setting. However, this also required removal of the embossing machine housing and was only practical for situations involving the embossing of a fairly extensive number of printing elements of the same kind between changes.

In the present invention, initial pressure adjustment for embossing is accomplished in a manner substantially similar to that just described. However, there is also provided an additional form of adjustment which not only entirely eliminates the need for changing the initial pin height or spring adjustment, but also can be controlled by the operator of the machine in a rapid and convenient manner without removing the housing and in such a way that it becomes fully practical to emboss alternate printing elements of two different types in rapid succession. This will now be described in detail.

In order to clarify the need for the additional automatic embossing pressure adjustment, it is pointed out that, using the examples hereinbefore selected as exemplary of the problem solved by the invention, i.e., the embossing of both metal and plastic plates, in general the metal plates are of a thickness of approximately .017″ whereas the plastic plates may be .030″ thick.

As will be seen in FIGS. 2, 3, 4 and 5, the present invention provides a variable adjustment member or auxiliary interposer, indicated generally at 50, which is mounted on the rocker arm 52 of the machine 20 so as to be slidable within the slotted head 41 of the pin 40 and underlying the standard interposer 43. The auxiliary interposer 50 has a stepped configuration and comprises a unitary member having a thin portion 54 and a comparatively thicker portion 56, the upper and lower faces of each of these portions being parallel. The purpose and manner of use of the interposer slide 50, and the significance of its parallel surfaces will be explained hereinafter.

The auxiliary interposer 50 is mounted for endwise sliding movement on the rocker arm 52 and is under control of the lever 58. As is shown in detail in FIGS. 3 and 5, the lever 58 is mounted for pivotal movement on the pin 60 and is bifurcated at one end so as to freely engage in pin 26 which forms a part of the interposer 50. At its other end the lever 58 is connected to a link 64, which in turn is connected to the plunger 66 of a solenoid 68. The pin 60 is fixed to the mounting bracket 70 for solenoid 68, which bracket is secured to a convenient portion of the machine frame.

Figure 3:
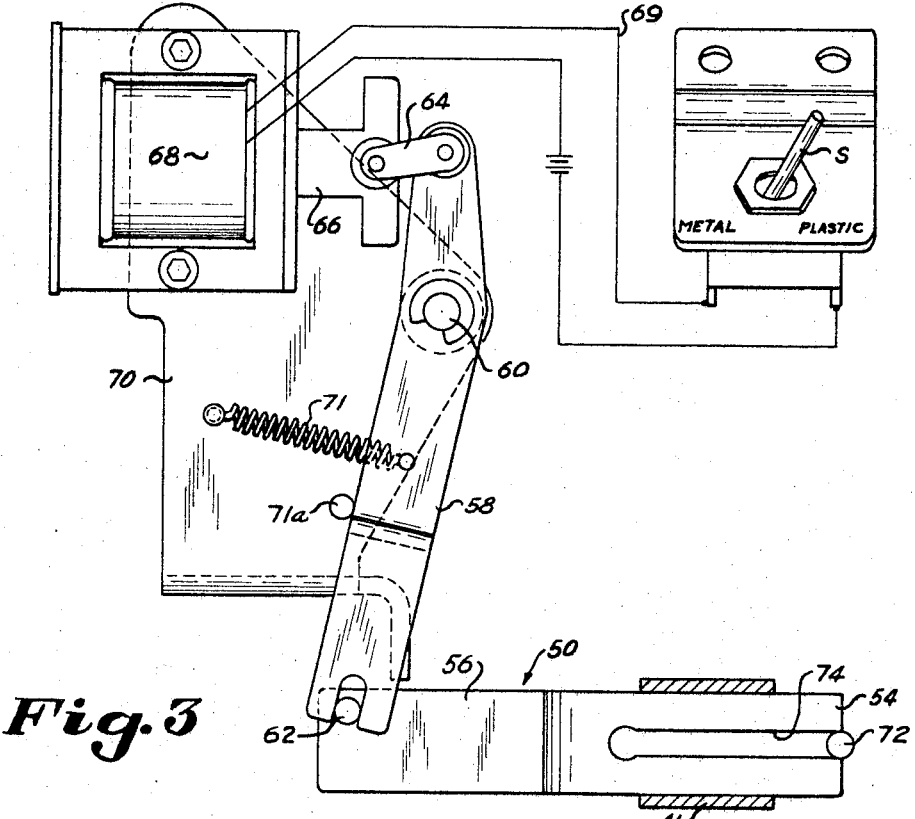
FIG. 3 is a view similar to FIG. 2, but illustrating the mechanism in another position for embossing another material, or a different thickness of a material; a schematic showing of the wiring also being included.
Figure 2:
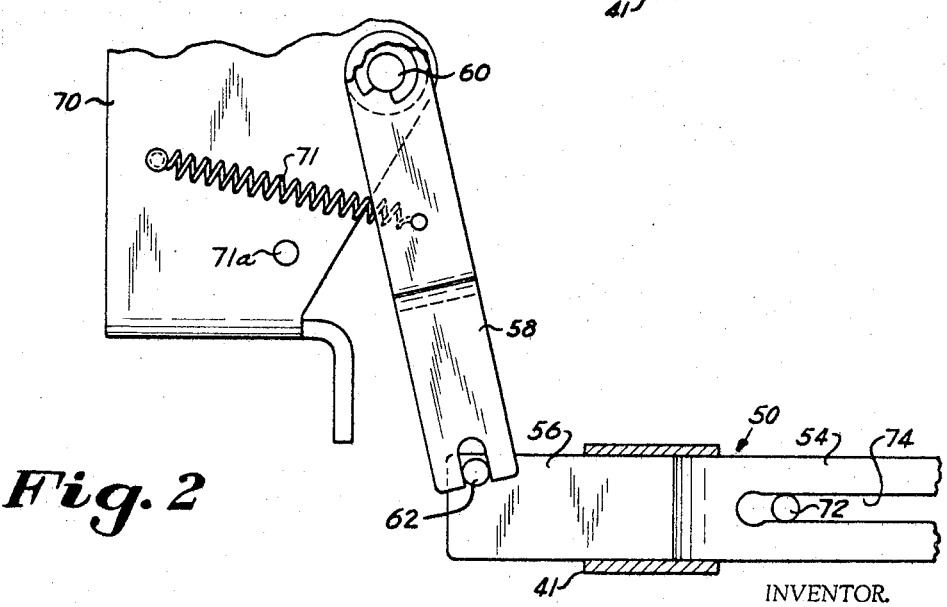
FIG. 2 is a detail section taken substantially on line 2—2 of FIG. 1 and showing the mechanism in position for embossing one material, or one thickness of a material.

The solenoid 68 is controlled by an electric circuit 69 which is opened and closed by a switch S. (FIGS. 1 and 3). As seen in FIG. 3, the open position of the switch (the position shown) is identified by the legend "PLASTIC" while the closed position is identified by the legend "METAL." The switch S is mounted outside the machine housing.

Solenoid 68 is shown in the "off" position in FIGS. 3 and 5, which according to the present showing corresponds to a condition to emboss plastic printing plates. Positioning of the switch S to the left, or "METAL" position will close circuit 69 and energize the solenoid 68, thereby causing the lever 58 and auxiliary interposer 50 to be moved to the position shown in FIG. 2. As will be readily seen, the auxiliary interposer is guided in its movement not only by the slot in head 41 but also by a pin 72 which cooperates with a slot 74 formed in the interposer. As will be apparent by reference to FIGS. 2 and 3, when the switch S is again positioned to the "PLASTIC" position, solenoid 68 is de-energized and spring 71 is effective to restore lever 58 and auxiliary interposer 50 to the position shown in FIG. 3. A pin 71a, secured to mounting bracket 70, arrests movement of lever 58 and interposer 50 when they have thus been restored to "PLASTIC" position.

Initial embossing pressure adjustment is obtained in a manner substantially similar to prior practice. However, due to the employment of the auxiliary interposer 50, the setting of the height of the pin 40 will be adjusted by means of nut 37 to compensate for the slight added thickness of the interposer. A preferable procedure for obtaining proper embossing pressure involves placing the interposer 50 in the position shown in FIGS. 1, 2 and 6 and abutting the pin 40 against the bottom surface of the interposer. Adjusting nut 38 is then set so as to establish the proper embossing pressure required to emboss a metal printing plate. With the machine thus adjusted for the embossing of a metal plate, all that is necessary to change over to the embossing of a plastic plate is the shifting of the auxiliary interposer 50 to the position shown in FIG. 3. No further adjustment is made.

This described adjustment is based on the metal plate's using the spring 36 to determine the metal embossing pressure, while accurate die height (as determined by the length of the die and the thickness of the thin portion 54 of the interposer 50) is relied on to determine the somewhat lighter pressure for embossing a plastic plate. It will be realized, however, that various combinations of materials can be accommodated, and that the two portions of the interposer 50 may in some cases be so related to each other and to the die length, that die height is the sole determining factor with regard to embossing pressure for both adjusted positions, the spring 36 either being stiff enough or being adjusted to solid position so as to act as a rigid element.

Figure 8:
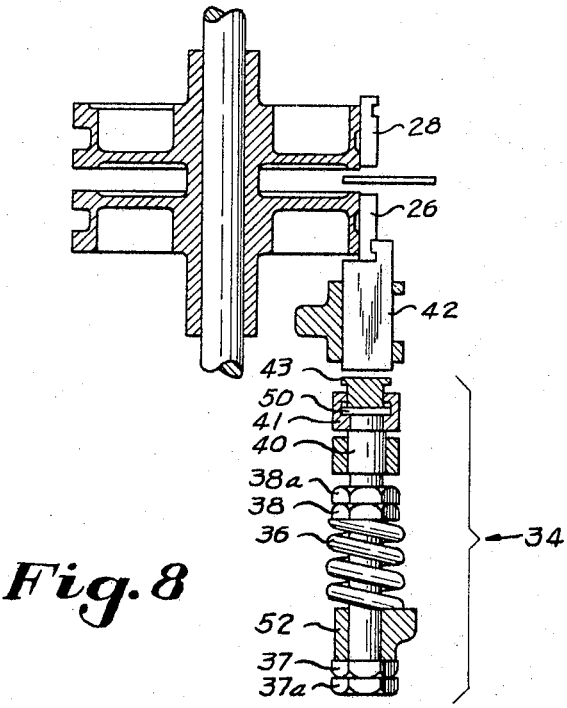
FIG. 8 is a detail section similar to FIGS. 6 and 7, showing the embossing mechanism in non-embossing position.
Figure 9:
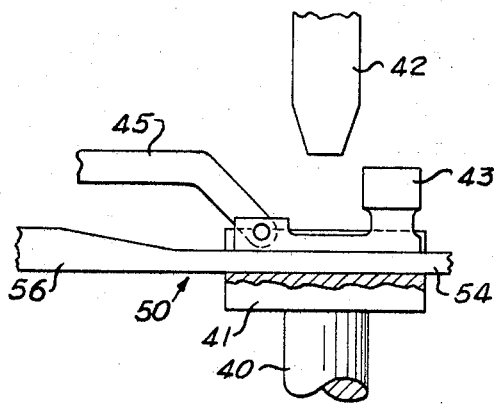
FIG. 9 is a front elevation on an enlarged scale of a portion of the embossing mechanism shown in FIG. 8, depicting the relation of certain of the parts in non-embossing position. Certain portions have been broken away for clarification.

In FIG. 8, the ram means is shown in non-embossing position, i.e., none of the character keys have been depressed. However, since the rocker arm 52 continues to oscillate even though no embossing is taking place, the interposer 43, see FIG. 9, is shifted out of alignment with the die plunger 42 so that the ram means is free of the plunger to thereby prevent any inadvertent movement of the die member 26. When a signal to emboss any character is given by the depressing of a character key, the interposer 43 is, in a well-known manner, automatically shifted by its link 45 into an interfering position, thereby rendering the rocker arm motion effective to cause an embossing operation.

From the foregoing description, it is apparent that the movable ram means 34 is an assembly of individual, interlinking portions, arranged in relation to each other to cooperate to drive the die 26 toward the die 28. Certain of the portions of the ram means are spreadable to receive between them the differing thickness sections of the auxiliary interposer 50. It follows then that the ram means 34 is actually extended in length by the insertion therein of the interposer 50. The degree of extension, of course, is controlled by the position of the interposer. Thus, when the interposer 50 is in the position shown in FIGS. 2 and 6, the thicker portion 56 of the interposer 50 is in operating position, thereby controlling the degree of extension of the ram means 34 and the pressure exerted thereby for the embossment of metal material. In like manner, when the interposer 50 is in the position shown in FIGS. 3 and 7, the thinner portion 54 is in operating position, thereby establishing the degree of extension of the ram means 34 and the pressure exerted thereby for the embossment of plastic material.

As stated hereinabove, the embossing machine with which the invention is concerned is of the type which includes a rotary die head. As fully explained in the above referred to Chisholm patent, in normal operation the die head 24 rotates constantly and is brought to a stop only when one of the keys of the keyboard is depressed. When the key is released, the various parts necessary to the embossing operation are restored to their non-operating positions and the die head resumes rotation. It should be noted that in the development of the present invention the ram means 34 has been extended to varying degrees to provide for different embossing pressures to accommodate different materials to be embossed. However, of great importance is the fact that even though the ram means has been thus variably extended, such extension has been accomplished in the unique manner described so that depression of a key will still effect embossing and release of the key will still free the die head to resume its otherwise normal constant rotation. In other words, even though the ram means has been physically extended by providing an additional variable embossing pressure adjustment feature, i.e., the auxiliary interposer 50, this has been accomplished without disturbing the normal embossing procedure upon depression of a key, or interfering with the normal idling rotation of the die head 24 on release of the key.

It will be understood that the "ram means" assembly, as used in this description, includes the combination shown, i.e., the die driving pin 40, compression spring 36, adjusting nut 38 and its locking nut 38a, interposer 43, and the shiftable, stepped auxiliary interposer 50 which controls the degree of extension of the ram means, all of which are mounted on the oscillatable rocker arm 52.

In the making of embossures which are to serve as printing elements, it is evident that extreme accuracy is required, and that an extremely precise overall length of the ram means 34 (which is responsible for producing the embossing effect based on a fixed throw of the rocker arm 52) is related in a very essential way to achieving this accuracy. The introduction of an adjusting mechanism into a heavily loaded system such as this would normally invite inaccuracies in length of the ram means of a degree which could not be tolerated in the present application. However, by arranging the adjusting member as an interposer with steps whose parallel faces can be accurately machined to desired thickness, and arranging the system so that the heavy embossing load is applied normal to these faces so as to remove any tendency for the embossing load to alter the die height adjustment, it is possible to provide a structure which is capable of exactly reproducible results in spite of the heavily loaded adjustment mechanism. Moreover, the very precise adjustment settings are built into the interposer itself so that no responsibility whatever for this accuracy falls upon the operator of the machine.

In the operation of the embossing machine, the operator first determines the type of printing plate to be embossed. As explained hereinabove, for the purpose of describing the invention, such a determination would, for example, involve a metal plate or a plastic plate. The operator then positions the switch S accordingly. In the case of embossing a plastic plate, the switch is positioned as shown in FIG. 3. By means of the structure hereinbefore described, the auxiliary interposer 50 and its related parts assume the position shown in FIG. 3 and thus present the thinner portion of the interposer at the embossing station. See also FIG. 7. In a similiar manner, if a subsequent plate to be embossed is of metal, the operator need only throw the switch to the position opposite to that shown in FIG. 3. This will energize solenoid 68 and the auxiliary interposer 50 will reach the position shown in FIG. 2, whereby its thicker portion will be presented in line with the embossing station. See also FIG. 6. Thus the embossing pressure and/or ram means extension needed for the particular assignment at hand is instantaneously and effortlessly obtainable, and the embossing machine is accordingly usable in applications where the types of printing members to be embossed are presented to the machine in random order with frequent alternations between the types.

While the form of the invention shown and described herein is admirably adapted to fulfill the objects primarily stated, it is to be understood that it is not intended to confine the invention to the form disclosed herein, for the invention is susceptible of embodiment in other forms and variations. It will be understood, therefore, that the invention is claimed in any of its forms or modifications falling within the spirit and scope of the language employed in the appended claims.

What is claimed is:

1. In a machine for embossing distinctly different sheet materials, each requiring its own predetermined level of embossing pressure, which includes pairs of coacting die members for squeezing a piece of sheet material between them to effect embossment:
   (a) movable ram means for forcing one of the die members of each pair towards the other, said ram means having spreadable portions;
   (b) said ram means including a unitary stepped interposer member having sections of different thickness each having parallel faces, said sections being selectively positionable between the spreadable portions of said ram means to control the pressure exerted thereby; and
   (c) means for controlling the position of the interposer to effect placement of the selected section thereof in the interposed position.

2. A machine as set forth in claim 1 which further includes a housing, and in which the means for controlling the position of the interposer includes power means within the housing and a manual control member for controlling said power means outside the housing.

3. In a machine for embossing distinctly different sheet materials, each requiring its own predetermined level of embossing pressure, which includes pairs of coacting die members for squeezing a piece of sheet material between them to effect embossment:
  (a) an oscillatable rocker arm;
  (b) movable ram means mounted on the rocker arm for forcing one of the die members of each pair towards the other, said ram means having spreadable portions;
  (c) said ram means including a unitary stepped interposer member having sections of different thickness each having parallel faces, said sections being selectively positionable between the spreadable portions of said ram means to control the pressure exerted thereby; and
  (d) means for controlling the position of the interposer to effect placement of the selected section thereof in the interposed position.

4. In a machine for embossing sheet material which includes a rotary die head containing pairs of coacting die members for squeezing a piece of sheet material between them to effect embossment:
  (a) a plunger for engaging one of the die members of each pair in turn as the head rotates;
  (b) ram means having spreadable portions, said ram means being movable between a position free of the plunger and a pressure applying position engaging the plunger for forcing the die member engaged by the plunger towards its complementary die member, said ram means including a unitary stepped interposer member having sections of different thickness selectively positionable between the spreadable portions of the ram means to control the degree of extension of the ram means towards the plunger and hence the pressure exerted thereby when the ram means is in pressure applying position, but without altering the position of said one die member when the ram means is free of the plunger; and
  (c) means for controlling the position of the interposer to effect placement of the selected section thereof in the interposed position.

5. In a machine for embossing both metal and plastic sheet materials, each requiring its own predetermined level of embossing pressure, which includes pairs of coacting die members for squeezing a piece of sheet material between them to effect embossment:
  (a) movable ram means for forcing one of the die members of each pair towards the other, said ram means having spreadable portions and including a unitary stepped interposer member having a thick portion and a thin portion each having parallel faces selectively positionable between the spreadable portions of said ram means to control the pressure exerted thereby; and
  (b) means for selecting said thick portion of the interposer for embossment of the metal material and for selecting said thin portion of the interposer for embossment of the plastic material.

References Cited

UNITED STATES PATENTS

| | | | |
|---|---|---|---|
| 856,377 | 6/1907 | Volker | 197—149 |
| 1,068,063 | 7/1913 | Kitz | 101—407 |
| 1,518,904 | 12/1924 | Duncan | 197—6.6 |
| 1,796,327 | 3/1931 | Gollnick | 101—407 |
| 1,906,304 | 5/1933 | Barrett | 101—93 |
| 2,115,456 | 4/1938 | Chisholm | 197—6.6 |
| 2,356,951 | 8/1944 | Runton | 101—407 |
| 2,380,257 | 7/1945 | Pasinski | 101—93 |
| 2,968,063 | 1/1961 | Derby | 101—401.1 |
| 3,059,750 | 10/1962 | Schnellmann | 197—6.6 |
| 3,099,343 | 7/1963 | D'onofrio | 197—127 |
| 3,123,194 | 3/1964 | Facius et al. | 197—149 |

WILLIAM B. PENN, *Primary Examiner.*

U.S. Cl. X.R.

101—407; 197—149